United States Patent [19]
Nawata

[11] Patent Number: 5,845,196
[45] Date of Patent: Dec. 1, 1998

[54] RADIO COMMUNICATION APPARATUS AND METHOD

[75] Inventor: Hizuru Nawata, Tokyo, Japan

[73] Assignee: NEC Corporation, Tokyo, Japan

[21] Appl. No.: 674,245

[22] Filed: Jul. 1, 1996

[30] Foreign Application Priority Data

Jun. 30, 1995 [JP] Japan .................................. 7-1882277

[51] Int. Cl.⁶ ...................................................... H04B 7/00
[52] U.S. Cl. .................................. 455/71; 455/63; 455/10
[58] Field of Search ................................ 455/70, 71, 63, 455/10, 3.2, 12.1, 427, 430

[56] References Cited

U.S. PATENT DOCUMENTS

| | | | |
|---|---|---|---|
| 4,912,773 | 3/1990 | Schiff | 455/71 |
| 5,208,835 | 5/1993 | Weeks et al. | 455/71 |
| 5,542,095 | 7/1996 | Petranovich | 455/71 |
| 5,548,821 | 8/1996 | Coveley | 455/70 |

FOREIGN PATENT DOCUMENTS

| | | |
|---|---|---|
| 421218 | 1/1992 | Japan . |
| 5191370 | 7/1993 | Japan . |
| 6311075 | 11/1994 | Japan . |
| 7235956 | 9/1995 | Japan . |

*Primary Examiner*—Ameila Au
*Attorney, Agent, or Firm*—Ostrolenk, Faber, Gerb & Soffen, LLP

[57] ABSTRACT

A frequency error occurring in a repeater station and a receiving side radio station is determined by using a dummy signal received from the repeater station, and is stored as frequency control data corresponding to the frequency error into a memory. By controlling a reception frequency based on the stored frequency control data, a data signal received from the repeater station is compensated for the frequency error. A relatively large frequency error such as the common frequency error occurring in the satellite and the downconverter of the receiving side can be eliminated effectively.

32 Claims, 4 Drawing Sheets

RADIO COMMUNICATION APPARATUS AND METHOD

BACKGROUND OF THE INVENTION

1. Field of the Invention

The present invention relates to radio communication systems via a repeater station such as a communications satellite, and in particular to a radio communication apparatus and method for compensating for frequency errors that may have occurred in a communication system.

2. Description of the Related Art

There have been known several methods by which multiple access may be achieved in satellite systems, including TDMA (time division multiple access (TDMA), pure ALOHA, and slotted ALOHA. In these multiple access methods, it is necessary to faithfully reproduce an original signal from a modulated burst signal received from each of earth stations which are widely distributed over the world.

In satellite communications, however, a burst signal generally includes frequency errors which are caused by up/down conversion in the transmission/reception system of each earth station and are caused by a frequency drift occurring in the satellite transponder. A frequency error caused in the transmission system of an earth station is different from that in another earth station, which can result in an interstation frequency error at the input to each earth station. On the other hand, frequency errors caused in the satellite transponder and the reception system of each earth station can be included commonly in all the burst signals received by the earth station.

The carrier recovery circuit at the receive side can sufficiently compensate for the interstation frequency error occurring in each of other earth stations. However, the common frequency errors which commonly appear in all received burst signals are much larger than the interstation frequency error. Therefore, it is difficult for the carrier recovery circuit to compensate for the common frequency errors by itself. If one tries to compensate for the common frequency errors by the carrier recovery circuit only, this compensation would be impossible without a long training bit field in the header of a burst signal. This manner is not a realistic solution because of reduced transmission efficiency. Then, an automatic frequency compensation (AFC) is required on the receive side where a pilot signal transmitted by the transmission side station is compared with a stable oscillator frequency. The use of AFC is necessary to compensate for any common frequency errors which may have occurred in the satellite and the receive side downconversion.

However, a communication apparatus employing the AFC function as mentioned above needs a pilot oscillator, a down-converter and a demodulator for receiving the pilot signal in addition to necessary circuits for transmitting and receiving burst signals. Moreover, since a standby apparatus is necessary for emergency in a system base station, it is very difficult to reduce the size of the entire system and to simplify the system arrangement, which results in increased cost.

SUMMARY OF THE INVENTION

An object of the present invention is to provide a method which is capable of maintaining the accuracy of a received frequency by compensating for frequency errors with simplified configuration of a communication system.

Another object of the present invention is to provide a method which is capable of reducing frequency errors of received signals.

Still another object of the present invention is to provide a communication apparatus which is capable of coping with the frequency errors of received signals with a simple arrangement.

According to the present invention, a frequency error occurring in a repeater station and a receiving side is determined by using a check signal or a dummy signal received from the repeater station, and frequency control data corresponding to the frequency error is stored into a memory. By controlling a reception frequency based on the stored frequency control data, a data signal received from the repeater station is compensated for the frequency error. Therefore, a relatively large frequency error such as the common frequency error occurring in the satellite and the downconverter of the receiving side can be eliminated effectively.

According to a first aspect of the present invention, the check signal comprising a predetermined code pattern is received from the repeater station which has transmitted the check signal at the predetermined frequency, and then a reception frequency of the check signal is determined when the predetermined code pattern is detected from the check signal. After storing the frequency control data corresponding to the reception frequency of the check signal, the data signal is received from the repeater station based on the frequency control data stored. A radio station itself may transmit the check signal to the repeater station and then receive it from the repeater station.

Preferably, the reception frequency of the check signal is determined by a local oscillation frequency which is adjusted so that the predetermined code pattern is detected from the check signal. In this case, the frequency control data is a signal value of the local oscillation control signal when the predetermined code pattern is detected from the check signal.

According to a second aspect of the present invention, in a method for compensating a received signal for a frequency error in a first radio station, the received signal being received from a second radio station via a repeater station, a predetermined signal comprising a predetermined code pattern is received from the repeater station transmitting the predetermined signal at a predetermined frequency. The frequency control data is determined by adjusting a reception frequency of the predetermined signal received from the repeater station so that the predetermined code pattern is detected from the predetermined signal. The frequency control data corresponding to the reception frequency of the predetermined signal is stored into a memory when the predetermined code pattern is detected from the predetermined signal. Based on the frequency control data, the received signal is compensated for the frequency error.

According to a third aspect of the present invention, the data signal which has been transmitted at a predetermined frequency by a repeater station is comprised of a first preamble code pattern followed by a first synchronization code pattern. As a first step, it is checked whether the data signal is received in an initial acquisition state where a carrier signal of the data signal is recovered from the first preamble code pattern. When the data signal is received in the initial acquisition state, the check signal is transmitted to the repeater station, the check signal comprising a second preamble code pattern followed by a second synchronization code pattern. When receiving the check signal from the repeater station which has transmitted the check signal at the predetermined frequency, a reception frequency of the check signal received from the repeater station is determined when the second synchronization code pattern is detected from the check signal and then the frequency control data corresponding to the reception frequency of the check signal is stored into the memory when the second synchronization code pattern is detected from the check signal. Based on the frequency control data stored, the data signal is received from the repeater station when the first synchronization code pattern is detected from the data signal.

Further preferably, it is checked whether the first synchronization code pattern is detected from the data signal within a predetermined time interval, and when the first synchronization code pattern fails to be detected from the data signal within the predetermined time interval, the check signal is transmitted to the repeater station. When the second synchronization code pattern fails to be detected from the check signal which was transmitted, the control returns to the first step.

As described above, according to the present invention, by receiving a check signal through the repeater station, the frequency error caused in the repeater station and the receiving side radio station is previously detected, and the frequency control data or frequency compensation data at that time is stored. When a data signal is received at a normal operation, compensation is made for the frequency error by using the stored frequency control data. Therefore, the data signal can be received with compensating for the common frequency error as well as the interstation frequency error. Since the pilot signal is not needed in the AFC like the prior art, a miniaturized and low-cost communication system can be achieved.

DESCRIPTION OF THE PREFERRED EMBODIMENTS

Figure 1:
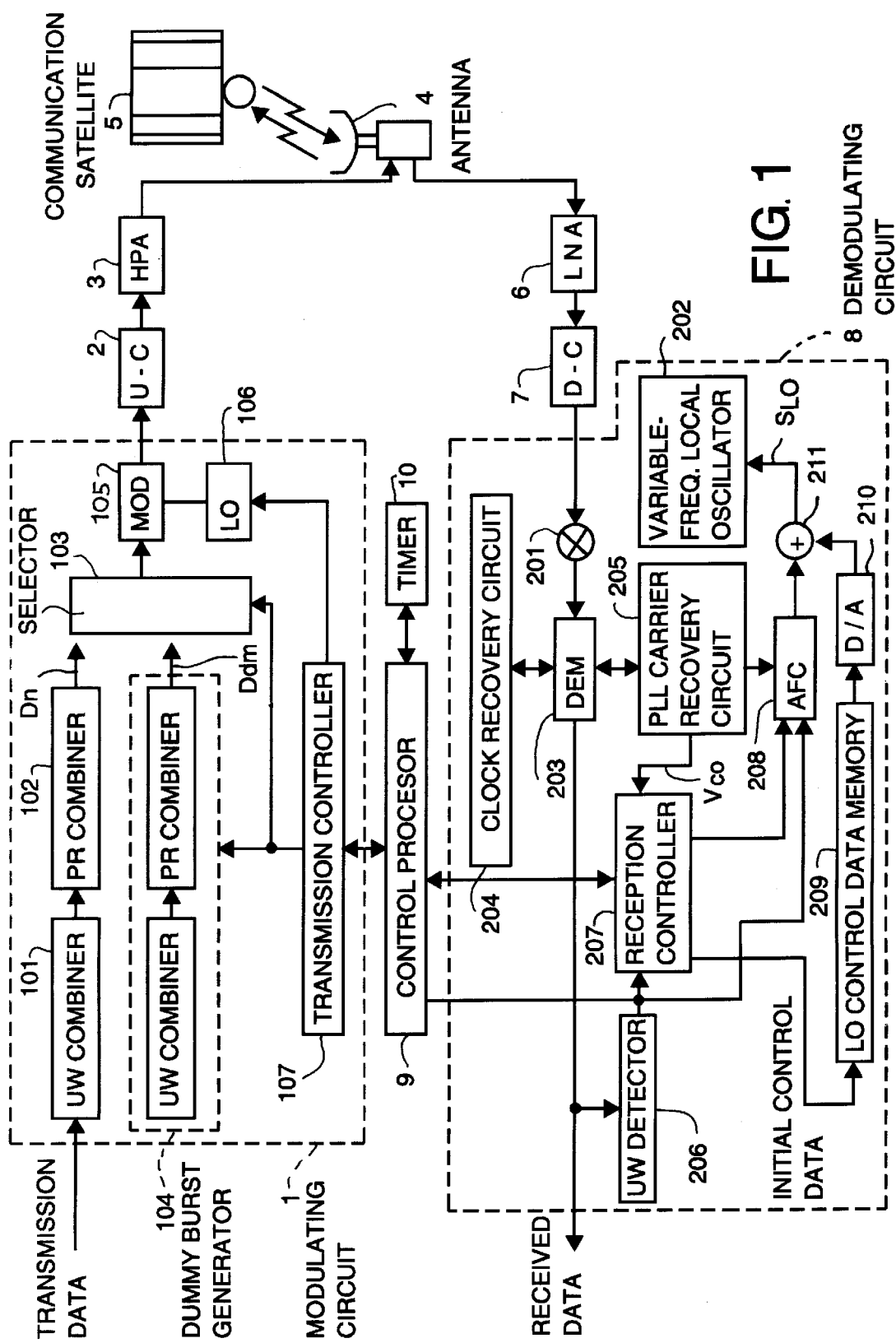
FIG. 1 is a block diagram schematically showing an embodiment of the communication system according to the present invention.

Referring to FIG. 1, an earth station is comprised of a transmission subsystem comprising a modulating circuit 1, an upconverter 2, and a high-power amplifier (HPA) 3, and a reception subsystem comprising a low-noise amplifier (LNA) 6, a downconverter 7, and a demodulating circuit 8. In the transmission subsystem, the modulating circuit 1 receives transmission data and burst modulates a carrier to produce a modulated burst signal. The modulated burst signal is upconverted to a predetermined transmitter RF frequency by the up-converter 2 and is then amplified by the high-power amplifier (HPA) 3 to a level suitable for transmission. The transmission burst RF signal which has been output from the high-power amplifier 3 is transmitted as an up-link signal to a communication satellite 5 through an antenna 4.

Receiving such an up-link signal from an earth station, the communication satellite 5 serves as a repeater allowing the up-link signal to be amplified and converted in frequency for the down-link.

A low-level burst RF signal received from the communication satellite 5 through the antenna 4 is input to the low-noise amplifier (LNA) 6 which amplifies it to keep the carrier-to-noise ratio at an acceptable value. The downconverter 7 converts the RF signal to an IF signal and passes it to the demodulating circuit 8 for extraction of the included information. The transmission and reception operations of the entire system are controlled by a control processor 9 using a timer 10 as necessary. A more detailed description will be provided hereinafter.

MODULATING CIRCUIT

The modulating circuit 1 selects a modulating signal from a data burst modulating signal $D_n$ for normal operation and a dummy burst modulating signal $D_{dm}$ for check operation under the control of the control processor 9 and then burst modulates a carrier according to the selected modulating signal to output the modulated burst signal to the upconverter 2.

More specifically, when transmission data is input to the modulating circuit 1, a UW combiner 101 adds a sequence known as a unique word (UW) for burst synchronization to the transmission data and passes it to a PR combiner 102. The PR combiner 102 further adds a prefixed bit pattern known as the preamble to it. The preamble consists of a carrier recovery code and a bit timing recovery code (see FIG. 2). By the UW combiner 101 and the PR combiner 102, the data burst modulating signal $D_n$ is generated based on the transmission data, and is output to a selector 103. On the other hand, a dummy burst generator 104 outputs the dummy burst modulating signal $D_{dm}$ to the selector 103 in accordance with control of a transmission controller 107. The dummy burst generator 104 is comprised of a UW combiner and PR combiner.

The selector 103 selects either the data burst modulating signal $D_n$ or the dummy burst modulating signal $D_{dm}$ in accordance with control of the transmission controller 107 and outputs the selected modulating signal to a modulator 105 of a predetermined modulation scheme. As described later, the data burst modulating signal $D_n$ of the transmission data is selected at a normal operation mode, and the dummy burst modulating signal $D_{dm}$ of the dummy burst is selected at an initial acquisition mode or a self-check mode. The modulator 105 burst modulates the carrier which is generated by a local oscillator 106 in accordance with the selected modulating signal and outputs the modulated burst signal to the upconverter 2.

DEMODULATING CIRCUIT

The demodulating circuit 8 performs the frequency error compensation in addition to a normal demodulation operation. The modulating circuit 8 is provided with a frequency converter comprising a mixer 201 and a variable-frequency local oscillator 202, which compensate the received IF burst signal for frequency errors. The mixer 201 receives the IF burst signal from the downconverter 7 and mixes it with the local oscillation signal generated by the local oscillator 202. Since the oscillation frequency of the local oscillator 202 varies in accordance with a control signal $S_v$, as described later, the local oscillator 202 can compensate the received burst signal for the frequency errors.

A demodulator 203 receives the frequency-converted burst signal from the mixer 201 and burst demodulates it into received data. The demodulator 203 performs the demodulation, as known well, by using a clock reproduced by a clock recovery circuit 204 and a carrier reproduced by a carrier recovery circuit 205. When the clock and the carrier have been reproduced, the demodulator 203 becomes in the initial acquisition state.

The carrier recovery circuit 205 is comprised of a well-known PLL (phase-locked loop) circuit comprising a voltage-controlled oscillator (VCO), a phase comparator, and a loop filter. Since the control voltage for the VCO becomes low when the carrier has been recovered, it can be easily checked whether a carrier has been recovered by monitoring the control voltage for the VCO.

A UW detector 206 detects the unique word (UW) from the received data produced by the demodulator 203. When detecting the unique word, the UW detector 206 outputs a UW detection signal to a reception controller 207, the control processor 9, and an AFC (automatic frequency compensation) circuit 208, respectively.

The reception controller 207 detects the initial acquisition of the demodulator 203 by monitoring the control voltage $V_{CO}$ received from the carrier recovery circuit 205, and further detects the detection of the unique word by monitoring the UW detection signal received from the UW detector 206. The reception controller 207 controls the AFC circuit 208 on the basis of the detection timing of the unique word and causes an LO control data memory 209 to store an LO initial control data at the detection timing of the unique word of the received dummy burst signal.

The AFC circuit 208 performs the AFC operation under control of the reception controller 207 in accordance with a frequency error signal which is the control voltage received from the carrier recovery circuit 205 so as to reduce the frequency errors. More specifically, in order to reduce the frequency errors in the carrier recovery circuit 205, the AFC circuit 208 varies the LO control signal $S_{LO}$ to adjust the local oscillation frequency supplied to the mixer 201. Such a loop including the AFC circuit 200 can compensate for a relatively small frequency error such as an interstation frequency error.

The initial LO control data to be stored in the LO control data memory 209 is LO control data which is used to compensate for a relatively large frequency error such as the common frequency error as mentioned before. As described above, since the common frequency error is included in the dummy burst signal received via the communication satellite 5, the LO initial control data can be determined on the basis of the LO control signal $S_{LO}$ at the time when the unique word of the received dummy burst signal is detected. The LO initial control data stored in the LO control data memory 209 is converted into analog by a digital-to-analog converter 210 which passes the LO control signal to an added 211. The adder 211 adds the LO initial control signal to the control signal output from the AFC circuit 208, and outputs the resultant to the local oscillator 202 as an LO control signal $S_{LO}$.

At initial acquisition of the demodulator 203, the control processor 9 controls the transmission controller 107 so that the dummy burst signal is generated and transmitted. Under the control of the control processor 9, the transmission controller 107 switches the selector 103 so as to select the dummy burst side and initiates the dummy burst generator 104. As a result, the dummy burst modulating signal $D_{dm}$ is generated and transferred to the modulator 105 through the selector 103, and the dummy burst RF signal is emitted from the antenna 4 to the communication satellite 5. Moreover, the controller processor 9 checks whether the unique word is detected within a predetermined time interval by using the timer 10. If the unique word is not detected within the predetermined time interval, the control processor 9 changes to self-check mode where the dummy burst signal is transmitted, as described later.

Figure 2A:
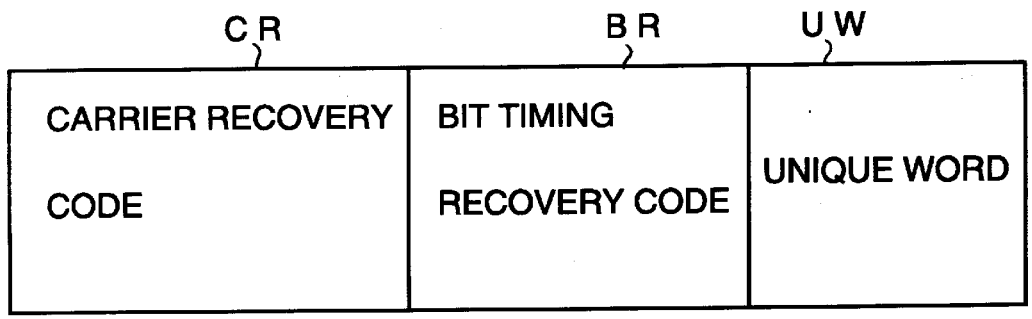
FIG. 2A is a format diagram showing an example of a dummy burst signal to be used according to this embodiment.
Figure 2B:
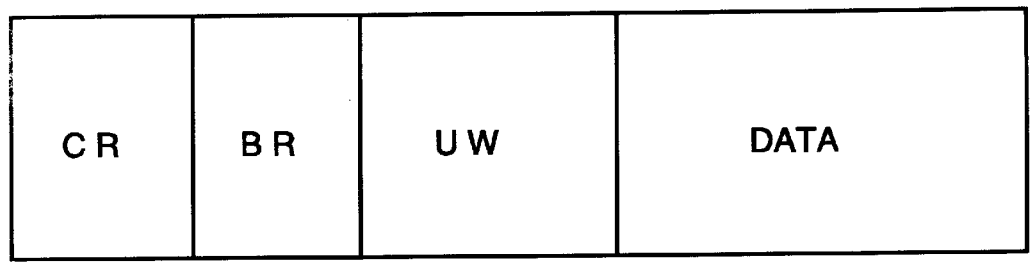
FIG. 2B is a format diagram showing an example of a data burst signal.

Comparing the signal formats as shown in FIGS. 2A and 2B, it is understood that the dummy burst signal of FIG. 2A has a carrier recovery code CR which is much longer than that of a normal burst signal of FIG. 2B. For example, the carrier recovery code CR of the dummy burst signal is about 1000 bits length in terms of the number of bits. Such a long carrier recovery code CR allows the carrier recovery circuit 205 of the demodulating circuit 8 to perform an accurate carrier reproduction even if the frequency and phase errors of the carrier are large. The unique word UW of the dummy burst signal is identical to that of the normal burst signal.

Figure 2C:
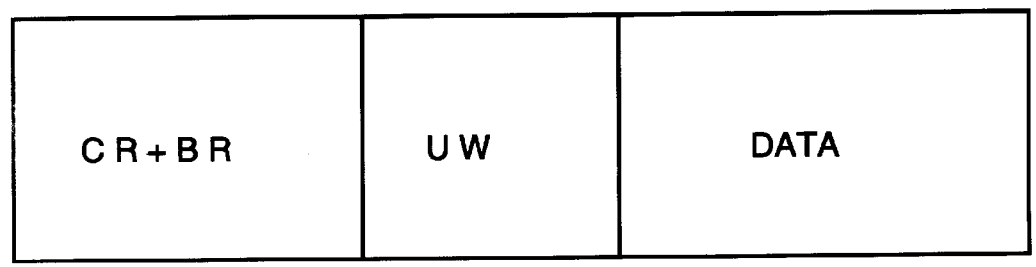
FIG. 2C is a format diagram showing another example of the data burst signal.

Alternatively, as shown in FIG. 2C, the carrier recovery code CR and the bit timing recovery code BR may be set to the same code CR+BR (for example, '101010 . . . 10') to concurrently perform the carrier recovery and the clock recovery. It is also a preferred embodiment of the present invention that a dummy burst signal and a data burst signal are generated by using such a preamble format that the carrier recovery code CR and the bit timing recovery code BR are combined into the same code CR+BR. In this case, the carrier recovery code and the bit timing recovery code (CR+BR) of the dummy burst signal are set to be longer than that of the data burst signal.

INITIAL CONTROL DATA DETERMINATION

Next, an operation of this embodiment shown in FIG. 1 will be described in detail with reference to the flowcharts.

Figure 3:
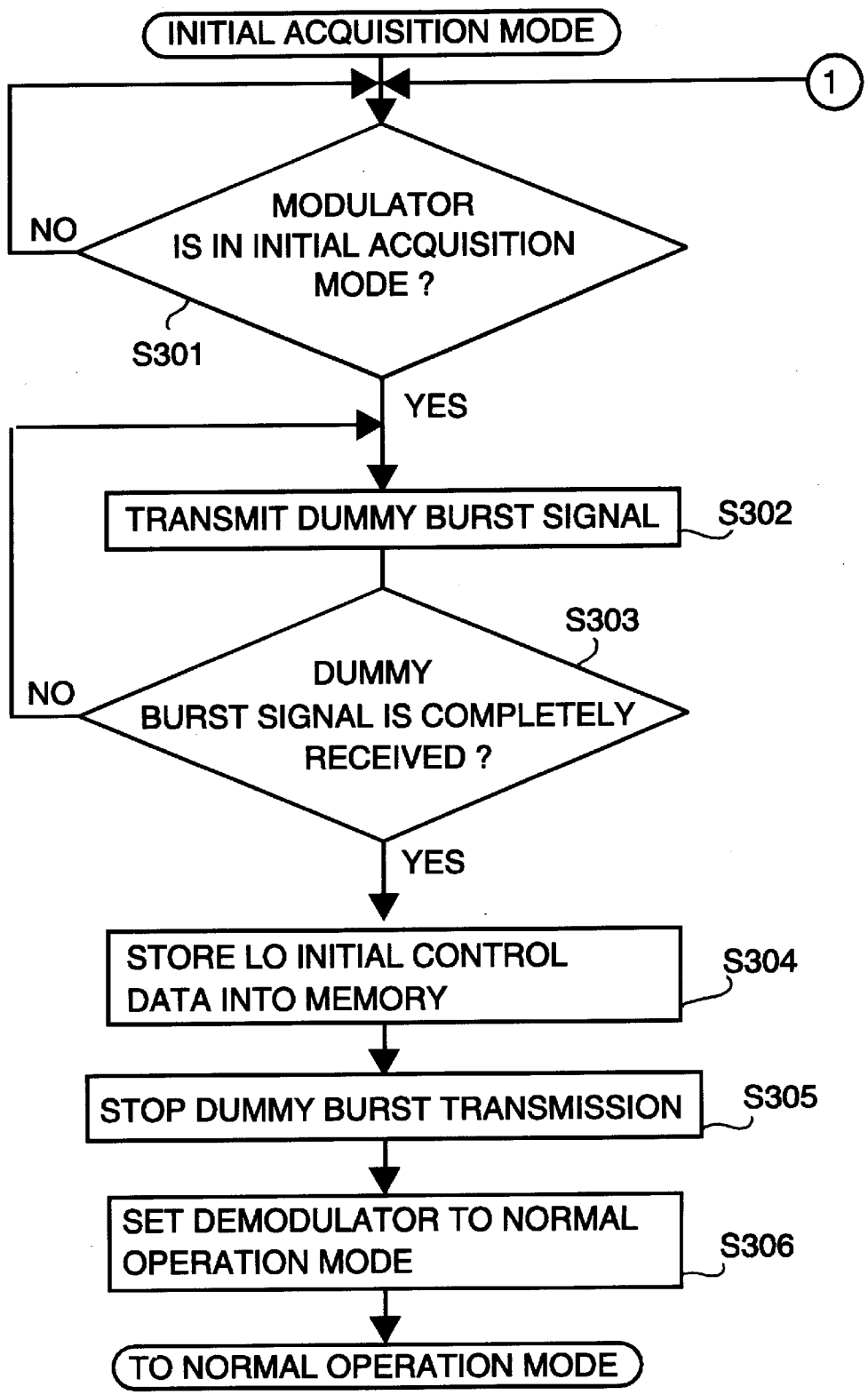
FIG. 3 is a schematic flowchart showing an initial operation of this embodiment at the initial acquisition mode.

Referring to FIG. 3, the control processor 9 checks through the reception controller 207 at all times whether the demodulator 203 reaches the initial acquisition state (step S301). When the demodulator 203 becomes in the initial acquisition mode (Yes of step S301), the control processor 9 instructs the transmission controller 107 to perform the dummy burst transmission and instructs the reception controller 207 to perform the dummy burst reception.

The transmission controller 107, receiving the instruction for the dummy burst transmission, performs the transmission control of the dummy burst signal such that the selector 103 selects the dummy burst generator 104 which generates the dummy burst modulating signal $D_{dm}$. The modulator 105 modulates the carrier wave generated by the local oscillator 106 in accordance with the dummy burst modulating signal $D_{dm}$, and the dummy burst signal as the modulated burst is output to the upconverter 2. Thus, the dummy burst RF signal is transmitted to the communication satellite 5 (step S302).

On the other hand, receiving the instruction of the dummy burst reception, the reception controller 207 checks whether the dummy burst signal has been received from the communication satellite 5 based on carrier and clock reproduction and unique word detection as describe before (step S303). More specifically, the carrier recovery circuit 205 performs carrier reproduction based on the pattern of the carrier recovery code CR of the dummy burst signal received from the communication satellite 5. In the carrier recovery, the AFC circuit 208 receives an error signal $V_{CO}$ indicating frequency and phase errors from the carrier recovery circuit 205, and outputs the LO control signal $S_{LO}$ to the local oscillator 202 through the adder 211 so as to adjust the local oscillation frequency of the local oscillator 202. When the error signal $V_{CO}$ of the carrier recovery circuit 205 is reduced below a predetermined level, based on the LO control signal $S_{LO}$ at that time, LO initial control data is determined as indicating a local oscillation frequency necessary for receiving the dummy burst signal. After the carrier recovery is completed, the clock reproduction is performed based on the bit timing recovery code BR of the dummy burst signal. In the case of the format shown in FIG. 2C, it is needless to say that carrier and clock are recovered concurrently based on the preamble CR+BR. After the carrier and clock reproduction is thus completed, the demodulator 203 demodulates a sequence following the bit timing recovery code BR from the received dummy burst signal, and the UW detector 206 detects the unique word UW.

At the time when the unique word UW is detected, the reception controller 207 recognizes that the frequency error or the common frequency error has been estimated. Therefore, when the unique word UW is detected and the reception of the dummy burst signal is successfully completed (Yes of step S303), the reception controller 207 stores LO initial control data indicating the LO control signal at that time into the LO control data memory 209 (step S304). In other words, the LO initial control data stored in the LO control data memory 209 is the compensation data of the common frequency error which is caused by the frequency drift of the transponder in the communication satellite 5 and the downconversion of the downconverter 7.

At the same time, the control processor 9 outputs the instruction indicative of stopping the dummy burst transmission to the transmission controller 107 (step S305). This causes the dummy burst generator 104 to stop generating the dummy burst modulating signal $D_{dm}$, and the selector 103 to select the data burst modulating signal $D_n$. Furthermore, the control processor 9 switches the demodulating circuit 8 to the normal operation mode (step S306).

NORMAL OPERATION MODE

In the normal operation mode, the common frequency error estimated based on the received burst signal is canceled out by adding the LO initial control data stored in the LO control data memory 209 to the output of the AFC circuit 208. The relatively small level error such as an interstation frequency error is reduced by the AFC circuit 208 using the carrier recovery code CR and the bit timing recovery code BR in the received data burst signal. Therefore, the frequency errors of the received data burst signal are effectively removed by the LO control signal $S_{LO}$ obtained by adding the output of the AFC circuit 208 and the output of the LO control data memory 209.

Figure 4:
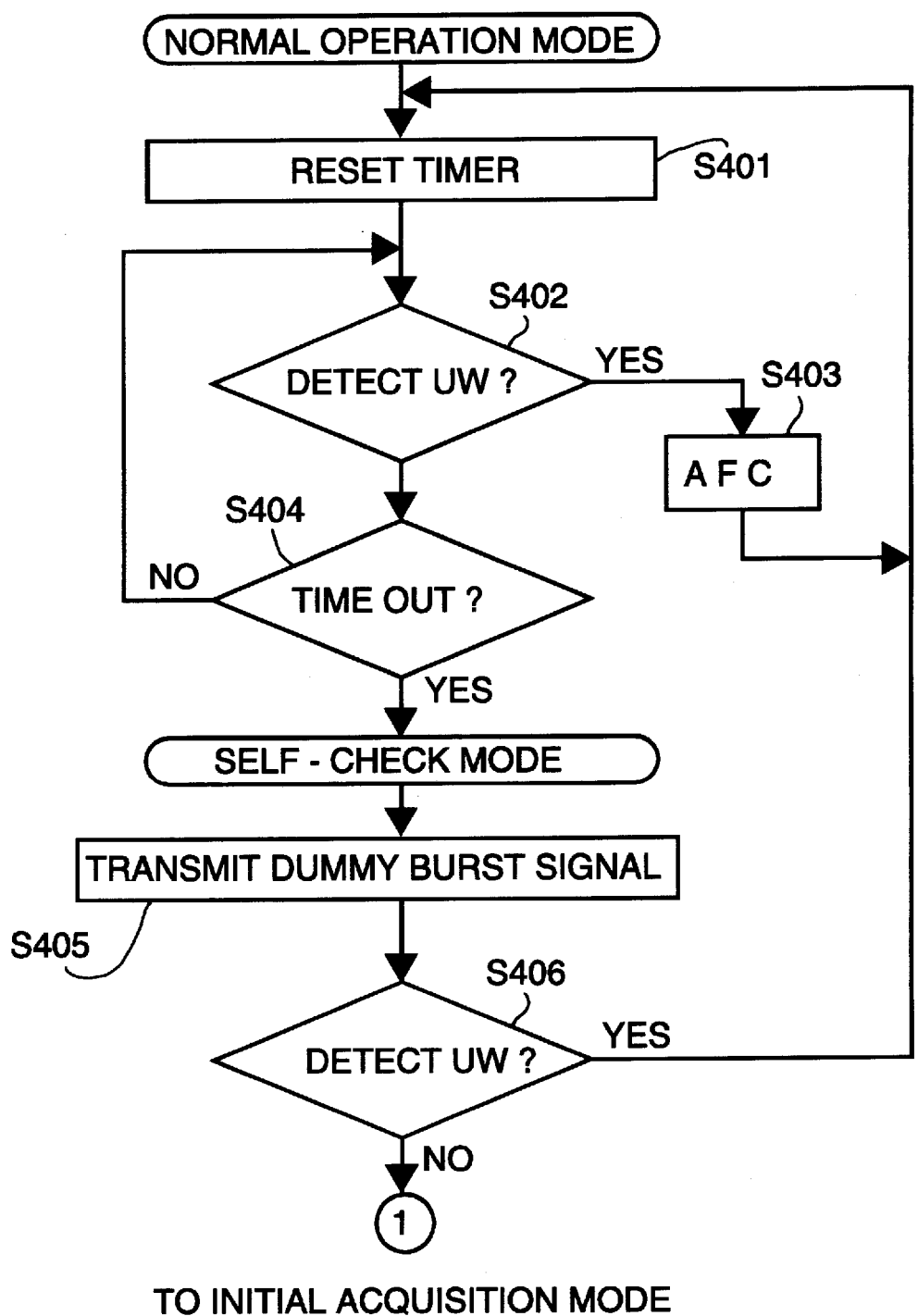
FIG. 4 is a schematic flowchart showing a normal operation of this embodiment at the normal operation mode.

Referring to FIG. 4, when the demodulating circuit 8 is switched to the normal operation mode, the control processor 9 resets the timer 10 (step S401), and then, checks whether the unique word UW has been detected by the UW detector 206 (step S402). If the unique word UW is detected (Yes of step S402), then the reception controller 207 puts the AFC circuit 208 into operation, causing the received data burst signal to be compensated for the relatively small level error such as an interstation frequency error as mentioned above (step S403). Since the length of the burst signal is predetermined, the length of the data field following the unique word UW can be calculated. Therefore, the reception controller 207 allows the AFC circuit 208 to be operated only in the data field based on the detection timing of the unique word UW. In other words, the frequency error compensation can be performed in the data field of a received data burst signal.

If the unique word UW is not detected (No of step S402), then it is checked whether the predetermined time interval preset in the timer 10 has passed (step S404), and the unique word detection step 402 is repeatedly performed until the predetermined time interval has passed.

If the unique word is not detected within the predetermined time interval (No of step S402 and Yes of S404), there is a possibility that the reception of a burst signal has been impossible, so that the modulating circuit 1 and the demodulating circuit 8 are shifted to the self-check mode. When in the self-check mode, the dummy burst generator 104 generates the dummy burst modulating signal $D_{dm}$ and outputs it to the modulator 105 through the selector 103, and the dummy burst RF signal is emitted toward the communication satellite 5 (step S405).

When receiving the dummy burst signal from the communication satellite 5, that is, when the unique word UW is detected by the unique word detector 206 (Yes of step S406), the control processor 9 determines that a burst signal can be normally received. After resetting the timer 10 (step S401), the control processor 9 returns to the above-mentioned sequence S402–S404.

If the unique word UW is not able to be detected (No of step S406), it is judged that the dummy burst signal is not able to be received, and the control processor 9 returns to the initial acquisition mode so as to perform the above-mentioned adjustment of the local oscillation frequency of the local oscillator 202 (S301–S306).

What is claimed is:

1. A method for receiving a data signal which has been transmitted at a predetermined frequency by a repeater station, comprising the steps of:

a) receiving a check signal from the repeater station, the check signal comprising a first preamble code pattern followed by a predetermined code pattern, wherein the repeater station transmits the check signal at the predetermined frequency;

b) determining a reception frequency of the check signal received from the repeater station when the predetermined code pattern is detected from the check signal;

c) storing frequency control data corresponding to the reception frequency of the check signal when the predetermined code pattern is detected from the check signal; and d) receiving the data signal from the repeater station based on the stored frequency control data, the data signal comprising a second preamble code pattern followed by the predetermined code pattern, wherein a length of the first preamble code pattern of the check signal is longer than that of the second preamble code pattern of the data signal.

2. The method according to claim 1, wherein the step (b) comprises the steps of:

adjusting a local oscillation frequency which determines the reception frequency of the check signal in accordance with a local oscillation control signal so that the predetermined code pattern is detected from the check signal; and determining the reception frequency of the check signal received from the repeater station when the predetermined code pattern is detected from the check signal.

3. The method according to claim 2, wherein, in the step (c), the frequency control data is a signal value of the local oscillation control signal when the predetermined code pattern is detected from the check signal.

4. The method according to claim 1, wherein the step (d) comprises the steps of:

setting a reception frequency level to the reception frequency determined by the frequency control data stored; and receiving the data signal at the reception frequency level of the reception frequency.

5. The method according to claim 1, wherein the step (d) comprises the step of receiving the data signal from the repeater station based on the frequency control data stored and an automatic frequency compensation (AFC) signal.

6. The method according to claim 5, wherein the step (d) comprises the steps of:
   setting a reception frequency level to the reception frequency determined by the frequency control data stored;
   adjusting a reception frequency of the data signal in accordance with the AFC signal relative to the reception frequency level; and
   receiving the data signal from the repeater station.

7. The method according to claim 1, wherein the first preamble code pattern comprises a first carrier recovery code and a first clock recovery code and the second code pattern comprises a second carrier recovery code and a second clock recovery code.

8. The method according to claim 1, wherein the second code pattern comprises a single code pattern for carrier recovery and clock recovery.

9. The method according to claim 1, wherein the step (a) comprises the steps of:
   transmitting the check signal to the repeater station; and
   receiving the check signal from the repeater station.

10. A method for compensating a received signal for a frequency error in a first radio station, the received signal being received from a second radio station via a repeater station, the method comprising the steps of:
   a) receiving a predetermined signal from the repeater station, the predetermined signal comprising a first preamble code followed by a predetermined code pattern, wherein the repeater station transmits the predetermined signal at a predetermined frequency;
   b) determining frequency control data by adjusting a reception frequency of the predetermined signal received from the repeater station so that the predetermined code pattern is detected from the predetermined signal;
   c) storing the frequency control data corresponding to the reception frequency of the predetermined signal when the predetermined code pattern is detected from the predetermined signal; and
   d) compensating the received signal for the frequency error based on the frequency control data the received signal comprising a second preamble code pattern followed by the predetermined code pattern, wherein a length of the first preamble code pattern of the predetermined signal is longer than that of the second preamble code pattern of the received signal.

11. The method according to claim 10, wherein the step (b) comprises the steps of:
   adjusting a local oscillation frequency which determines the reception frequency of the predetermined signal in accordance with a local oscillation control signal so that the predetermined code pattern is detected from the predetermined signal; and
   determining the frequency control data corresponding to the local oscillation frequency when the predetermined code pattern is detected from the predetermined signal.

12. The method according to claim 10, wherein the step (d) comprises the step of compensating the received signal for the frequency error by setting a reception frequency level to the reception frequency determined by the frequency control data stored.

13. The method according to claim 10, wherein the step (d) comprises the step of compensating the received signal for the frequency error based on the frequency control data stored and an automatic frequency compensation (AFC) signal.

14. The method according to claim 13, wherein the step (d) comprises the steps of:
   setting a reception frequency level to the reception frequency determined by the frequency control data stored; and
   adjusting a reception frequency of the received signal in accordance with the AFC signal relative to the reception frequency level.

15. The method according to claim 10, wherein the first preamble code pattern comprises a first carrier recovery code and a first clock recovery code and the second code pattern comprises a second carrier recovery code and a second clock recovery code.

16. The method according to claim 10, wherein the second code pattern comprises a single code pattern for carrier and clock recovery.

17. The method according to claim 10, wherein the step (a) comprises the steps of:
   transmitting the predetermined signal to the repeater station; and
   receiving the predetermined signal from the repeater station.

18. A method for receiving a data signal which has been transmitted at a predetermined frequency by a repeater station, the data signal comprising a first preamble code pattern followed by a first synchronization code pattern, the method comprising the steps of:
   a) checking whether the data signal is received in an initial acquisition state where a carrier signal of the data signal is recovered from the first preamble code pattern;
   b) transmitting a check signal to the repeater station when the data signal is received in the initial acquisition state, the check signal comprising a second preamble code pattern followed by a second synchronization code pattern;
   c) receiving the check signal from the repeater station, the repeater station transmitting the check signal at the predetermined frequency;
   d) determining a reception frequency of the check signal received from the repeater station when the second synchronization code pattern is detected from the check signal;
   e) storing frequency control data corresponding to the reception frequency of the check signal when the second synchronization code pattern is detected from the check signal; and
   f) receiving the data signal from the repeater station based on the frequency control data stored when the first synchronization code pattern is detected from the data signal.

19. The method according to claim 18, wherein the step (d) comprises the steps of:
   adjusting a local oscillation frequency which determines the reception frequency of the check signal in accordance with a local oscillation control signal so that the second synchronization code pattern is detected from the check signal; and
   determining the reception frequency of the check signal received from the repeater station when the second synchronization code pattern is detected from the check signal.

20. The method according to claim 19, wherein, in the step (e), the frequency control data is a signal value of the local oscillation control signal when the second synchronization code pattern is detected from the check signal.

21. The method according to claim 18, wherein the step (f) comprises the steps of:
   setting a reception frequency level to the reception frequency determined by the frequency control data stored;
   checking whether the first synchronization code pattern is detected from the data signal; and
   receiving the data signal at the reception frequency level of the reception frequency.

22. The method according to claim 18, wherein the step (f) comprises the step of receiving the data signal from the repeater station based on the frequency control data stored and an automatic frequency compensation (AFC) signal when the first synchronization code pattern is detected from the data signal.

23. The method according to claim 22, wherein the step (f) comprises the steps of:
   setting a reception frequency level to the reception frequency determined by the frequency control data stored;
   adjusting a reception frequency of the data signal in accordance with the AFC signal relative to the reception frequency level;
   checking whether the first synchronization code pattern is detected from the data signal; and
   receiving the data signal from the repeater station.

24. The method according to claim 18, wherein a length of the second preamble code pattern of the check signal is longer than that of the first preamble code pattern of the data signal.

25. The method according to claim 18, wherein the first preamble code pattern comprises a first carrier recovery code and a first clock recovery code and the second preamble code pattern comprises a second carrier recovery code and a second clock recovery code.

26. The method according to claim 18, wherein the first code pattern comprises a single code pattern for carrier recovery and clock recovery.

27. The method according to claim 18, further comprising the steps of:
   g) checking whether the first synchronization code pattern is detected from the data signal within a predetermined time interval;
   h) transmitting the check signal to the repeater station when the first synchronization code pattern fails to be detected from the data signal within the predetermined time interval;
   i) receiving the check signal which was transmitted in the step (h) from the repeater station; and
   j) returning to the step (a) when the second synchronization code pattern fails to be detected from the check signal which was transmitted in the step (h).

28. A method for receiving a data burst signal which has been transmitted at a predetermined frequency by a repeater station, comprising the steps of:
   a) transmitting a check burst signal to the repeater station, the checks burst signal comprising a first preamble code pattern followed by a predetermined code pattern;
   b) receiving the check burst signal from the repeater station, the repeater station transmitting the check burst signal at the predetermined frequency;
   c) compensating the check burst signal received from the repeater station for a frequency error when the predetermined code pattern is detected from the check burst signal;
   d) storing frequency control data corresponding to the frequency error; and
   e) receiving the data burst signal from the repeater station based on the stored frequency control data, the data burst signal comprising a second preamble code pattern followed by the predetermined code pattern.

29. A method for compensating a received burst signal for a frequency error in a first station, the received burst signal being received from a second radio station via a repeater station, the method comprising the steps of:
   a) transmitting a predetermined burst signal to the repeater station, the predetermined burst signal comprising a first preamble code pattern followed by a predetermined code pattern;
   b) receiving the predetermined burst signal from the repeater station, the repeater station transmitting the predetermined burst signal at a predetermined frequency;
   c) compensating the predetermined burst signal for the frequency error by adjusting a reception frequency of the predetermined burst signal received from the repeater station so that the predetermined code pattern is detected from the predetermined burst signal;
   d) storing frequency control data corresponding to the frequency error when the predetermined code pattern is detected from the predetermined burst signal; and
   e) compensating the received burst signal for the frequency error based on the frequency control data, the received burst signal comprising a second preamble code pattern followed by the predetermined code pattern.

30. A radio communication apparatus which communicates with a repeater station in a dummy burst communication system, the apparatus comprising:
   transmitting means for transmitting a dummy signal to the repeater station, the dummy burst signal comprising a first preamble code pattern followed by a predetermined code pattern;
   receiving means for receiving the dummy burst signal from the repeater station which transmits the dummy burst signal at a predetermined carrier frequency;
   frequency error detection means for detecting a carrier frequency error based on the dummy burst signal received from the repeater station;
   frequency adjustment means for adjusting a reception frequency of the dummy burst signal so that the carrier frequency error is reduced;
   storage means for storing frequency control data corresponding to the reception frequency of the dummy burst signal when the predetermined code pattern is detected from the dummy burst signal received from the repeater station; and
   demodulation means for demodulating a data burst signal into received data, the data burst signal comprising a second preamble code pattern followed by the predetermined code pattern, wherein the data burst signal is received from the repeater station at a reception frequency level determined based on the stored frequency control data.

31. A radio communication apparatus which communicates with a repeater station in a burst communication system, the apparatus comprising:

transmitting means for transmitting a dummy burst signal to the repeater station, the dummy burst signal comprising a first preamble code pattern followed by a predetermined code pattern;

receiving means for receiving the dummy burst signal from the repeater station which transmits the dummy burst signal at a predetermined carrier frequency;

frequency control means for detecting a carrier frequency error based on the dummy burst signal received from the repeater station and adjusting a reception frequency of the dummy burst signal so that the carrier frequency error is reduced;

storage means for storing frequency control data which causes the frequency control means to provide the reception frequency of the dummy burst signal when the predetermined code pattern is detected from the dummy burst signal received from the repeater station; and demodulation means for demodulating a data burst signal into received data, the data burst signal comprising a second preamble code pattern followed by the predetermined code pattern, wherein the data signal is received from the repeater station at a reception frequency level determined based on the stored frequency control data.

32. A radio communication apparatus which communicates with a repeater station in a burst communication system, the apparatus comprising:

transmitting means for transmitting a dummy burst signal to the repeater station, the burst signal comprising a first preamble code pattern followed by a predetermined code pattern;

receiving means for receiving the dummy burst signal from the repeater station which transmits the dummy burst signal at a predetermined carrier frequency;

AFC means for detecting a carrier frequency error based on the dummy burst signal received from the repeater station and for adjusting a reception frequency so that the carrier frequency error is reduced when the predetermined code pattern is detected from the dummy burst signal received from the repeater station;

storage means for storing frequency control data which causes the AFC means to provide a first reception frequency corresponding to the frequency control data;

control means for controlling the AFC means such that the AFC means provides a second reception frequency based on the frequency control data; and demodulation means for demodulating a data burst signal into received data, the data burst signal comprising a second preamble code pattern followed by the predetermined code pattern, wherein the data burst signal is received from the repeater station at the second reception frequency provided by the AFC means.

* * * * *